W. H. CLARK.
FRICTION-CLUTCH.
No. 191,314. Patented May 29, 1877.
Fig: 1.
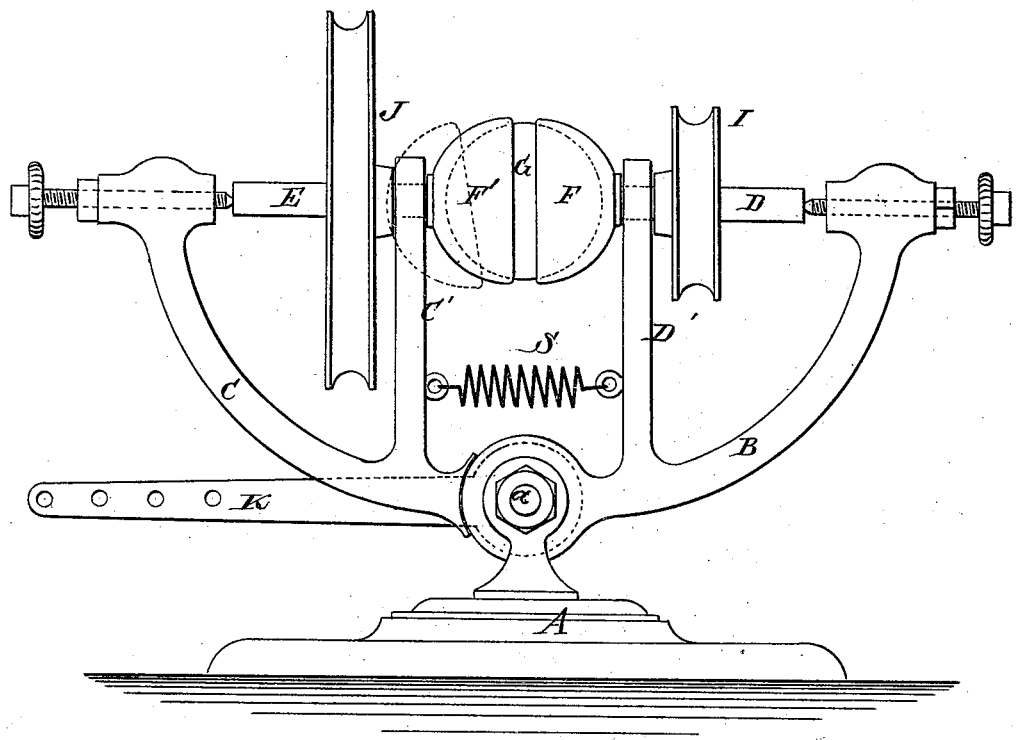
Fig: 2.
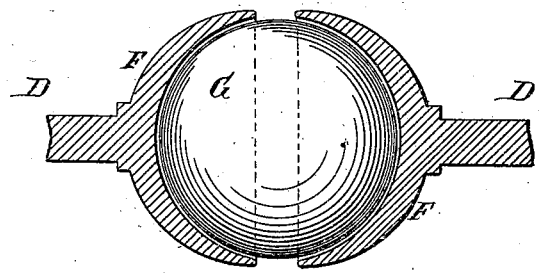
WITNESSES:
Chas. Nida
J. H. Scarborough
INVENTOR:
W. H. Clark.
BY
Munn
ATTORNEYS.

UNITED STATES PATENT OFFICE.

WILLIAM H. CLARK, OF CHICAGO, ILLINOIS.

IMPROVEMENT IN FRICTION-CLUTCHES.

Specification forming part of Letters Patent No. 191,314, dated May 29, 1877; application filed May 12, 1877.

*To all whom it may concern:*

Be it known that I, WILLIAM H. CLARK, of Chicago, Cook county, Illinois, have invented a new and Improved Friction-Clutch, of which the following is a specification:

Figure 1 is a side elevation of my improved clutch. Fig. 2 is a sectional view of the clutch-cups with the ball between them.

Similar letters of reference indicate corresponding parts.

This invention has relation to friction-clutches; and it consists, mainly, in the combination of cups and a friction-ball mounted on spindles, which have their bearings in a jointed frame, as will be hereinafter explained.

In the annexed drawing, A designates a base-plate or bracket, from which rises a curved limb, B, rigidly applied to it, and also a curved limb, C, jointed at *a*.

D E designate spindles, which are journaled in bearings formed on the extremities of the limbs C D and their branches C′ D′. Shaft or spindle D carries a pulley, I, and has a hemispherical cup, F, applied on one end.

Shaft or spindle E carries a pulley, J, and has a hemispherical cup, F′, on one end. When the two spindles E D are in the position shown in Fig. 1 in full lines, their axes coincide.

Between the two hemispherical cups F F′ I apply a ball, G, which is preferably made of india-rubber, although it may be made of any other elastic substance.

When the two cups are drawn in close contact with the ball G by the recoil of a spring, S, the spindles D E will rotate together—that is to say, motion imparted to one spindle will be transmitted to the other through the medium of the ball G.

The curved limb C has an arm, K, secured to it, which may be connected to a treadle, thus allowing a person to reduce the friction of the clutch, or to relieve it altogether of friction.

My improved clutch is applicable to sewing-machines and all kinds of light machinery, wherein it is desired to have a variable motion and to stop the motion of a shaft at pleasure.

Having thus described my invention, I claim as new and desire to secure by Letters Patent—

The cups F F′ and intermediate ball G, in combination with spindles D E, the latter having its bearings in a frame, C C′, which is pivoted at *a*, and acted on by a spring, S, substantially as described.

WILLIAM H. CLARK.

Witnesses:
JOHN C. MOORE,
GEO. E. FOSS.